United States Patent
Bamberg et al.

(10) Patent No.: US 8,481,975 B2
(45) Date of Patent: Jul. 9, 2013

(54) METHOD AND ARRANGEMENT FOR DETECTING A SURFACE OF AN OBJECT

(75) Inventors: Joachim Bamberg, Dachau (DE);
Roland Höfling, Chemnitz (DE);
Wilhelm Satzger, München (DE)

(73) Assignee: MTU Aero Engines AG, München (DE)

( * ) Notice: Subject to any disclaimer, the term of this patent is extended or adjusted under 35 U.S.C. 154(b) by 588 days.

(21) Appl. No.: 12/666,641

(22) PCT Filed: Jun. 6, 2008

(86) PCT No.: PCT/DE2008/000967
§ 371 (c)(1),
(2), (4) Date: Jun. 14, 2010

(87) PCT Pub. No.: WO2009/000231
PCT Pub. Date: Dec. 31, 2008

(65) Prior Publication Data
US 2011/0133102 A1 Jun. 9, 2011

(30) Foreign Application Priority Data
Jun. 26, 2007 (DE) .......... 10 2007 029 440

(51) Int. Cl.
*G01N 21/64* (2006.01)
(52) U.S. Cl.
USPC .................................... 250/461.1
(58) Field of Classification Search
USPC .................................... 250/461.1
See application file for complete search history.

(56) References Cited

U.S. PATENT DOCUMENTS

| | | | | |
|---|---|---|---|---|
| 4,230,741 A * | 10/1980 | Yamazaki et al. | ............ | 427/67 |
| 5,061,076 A * | 10/1991 | Hurley | .......................... | 356/417 |
| 6,024,449 A | 2/2000 | Smith | | |
| 6,195,891 B1 * | 3/2001 | Chen et al. | ................... | 29/889.1 |
| 7,103,212 B2 * | 9/2006 | Hager et al. | .................. | 382/154 |
| 7,623,142 B2 * | 11/2009 | Jilani et al. | .................... | 359/290 |

FOREIGN PATENT DOCUMENTS

| | | |
|---|---|---|
| DE | 37 21 247 A1 | 3/1988 |
| DE | 3721247 * | 3/1988 |
| EP | 0079754 A2 | 5/1983 |
| EP | 0 947 802 A | 10/1999 |
| EP | 1 048 393 A | 11/2000 |
| EP | 1 777 491 A | 4/2007 |
| GB | 2227966 A | 8/1990 |

OTHER PUBLICATIONS

PCT/DE2008/000967, International Search Report and Written Opinion, Nov. 18, 2008.

* cited by examiner

*Primary Examiner* — David Porta
*Assistant Examiner* — Edwin Gunberg
(74) *Attorney, Agent, or Firm* — Howison & Arnott, L.L.P.

(57) ABSTRACT

The invention relates to a method for optically detecting surfaces wherein strip patterns are projected onto the surface, images are captured, and the three-dimensional contour thereof is determined from the reproduction of the strip pattern on the surface of the object. The aim of the invention is to prevent reflections that interfere with the images and as a result, the surface of the object is covered with a layer of a fluorescent material, is then radiated with ultraviolet radiation, and the radiation emitted by the fluorescent material in the visible light is detected.

8 Claims, 1 Drawing Sheet

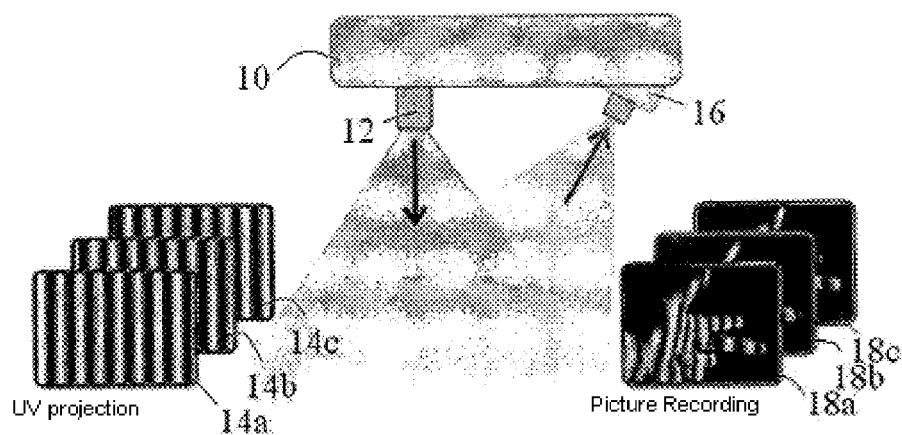

METHOD AND ARRANGEMENT FOR DETECTING A SURFACE OF AN OBJECT

CROSS-REFERENCE TO RELATED APPLICATIONS

This application is a U.S. National Phase application submitted under 35 U.S.C. §371 of Patent Cooperation Treaty application serial no. PCT/DE2008/000967, filed 6 Jun. 2008, and entitled METHOD AND ARRANGEMENT FOR DETECTING A SURFACE OF AN OBJECT, which application claims priority to German patent application serial no. 10 2007 029 440.0, filed 26 Jun. 2007, and entitled VERFAHREN UND ANORDNUNG ZUM ERFASSEN EINER OBERFLÄCHE EINES OBJEKTS, the specifications of which are incorporated herein by reference in their entireties.

TECHNICAL FIELD

The invention relates to a method as well as an arrangement for detecting the surface of an object, with the main interest presently being detecting surfaces of engine parts, especially for aircraft.

BACKGROUND

Typically investigations must especially be made of the surfaces of turbine blades. The detection is optical: a radiation pattern is projected onto the surface, than then a picture of the surface is taken. What is here understood by projection of a radiation pattern is that the projected beam has spatial variations in intensity in cross section. One example of a radiation pattern is a strip pattern in which the intensity of the radiation is modulated in sine-wave fashion for example along an axis, and remains constant along the direction perpendicular thereto, corresponding to the value of the sine-wave-modulated intensity. Instead of a strip pattern, a checkerboard pattern can also be used. If the surface is totally flat and the radiation pattern is incident in exactly perpendicular fashion onto the surface, then in the picture recordings one obtains a precise depiction of the emitted radiation pattern. The more the surface deviates from a flat surface, the more the radiation pattern is distorted. Thus, by means of a picture analysis, based on the distortion of the radiation pattern by which structures having their origin in the radiation pattern are formed, retroactive conclusions can be made about the surface curvature. If a suitable computer evaluation unit is part of the arrangement, a three-dimensional picture of the surface can be computer-derived. At regular intervals the radiation pattern is temporally varied, so that the surface can be searched precisely.

The result has been that with optical detection of a surface of numerous objects, for example metallic objects, which engine parts are, disturbing reflections occur. Owing to the reflections, detection of the structures deriving back to the radiation pattern in the pictures becomes difficult, and the place on the surface of the object from which the reflection propagates is only analyzed with difficulty. To reduce reflections, often diffusely scattering layers are applied to the objects to be investigated. However, only certain diffusely scattering layers can be applied on engine parts, because they require authorization. It is time-consuming to apply the layers. They also are applied on the thickness, which impairs the precision of surface analysis. Diffusely scattering layers also cannot suppress intensity noise, often designated as speckle noise. Lastly, diffusely scattering layers must be removed, which is very difficult.

SUMMARY

The task of the disclosure is to make available a method and an arrangement for detection of the surface of an object, especially of an engine part such as a turbine blade, in which the problems named do not arise, and in which especially disturbing reflections are effectively prevented.

The problem is solved by a process with features as described and claimed herein and an arrangement with the features as described and claimed herein.

Thus, the disclosure-specific process includes the following steps:
application of a film made of fluorescing material to the surface which, when irradiated with electromagnetic radiation from a first wavelength range, emits electromagnetic radiation in a second wavelength range,
irradiation of the surface with the film with a radiation pattern while using electromagnetic radiation from the first wavelength range,
reception of the radiation issued from the surface with the film for taking at least one picture,
analysis of structures shown on the picture, deriving from the radiation pattern, for detection of the surface.

Through use of the fluorescing material, it is possible to design a radiation source and radiation receiver for various wavelength ranges, the result of which is that even if reflections appear despite the fluorescence light that scatters diffusely per se, these do not appear in the pictures, or at least are not so pronounced.

It has also been shown that in accordance with the disclosure, intensity noise (speckle noise) is suppressed. The classic case of fluorescence is that ultraviolet light is irradiated, and light in the visible range is received for recording of pictures. As compared to irradiation likewise in visible light, higher measurement accuracy is achieved by use of the shorter-wavelength ultraviolet light.

To suppress reflections with particular effectiveness, provision can be made that when the emitted radiation is received, a filter is used for filtering out the radiation from the first wavelength range. By this means, impairment of measurement (or detection of the surface) is reliably avoided if impinging light is not absorbed by the film made of fluorescing material, but rather is reflected. The filter can extend over the entire wavelength range in which the electromagnetic radiation is absorbed, but it suffices to design it so that it filters out precisely those wavelengths at which the surface is irradiated. The latter can be a portion of the first wavelength range; for example, if a laser is used for the irradiation, an exact wavelength can be set.

In a preferred embodiment form, the fluorescing material includes a solvent with a fluorescing dye in solution. Such a fluorescence medium is permitted for all engine parts, and especially has an advantage of being light and easily washed off. Included then in the process is also washing the film off the surface after the analysis. The fluorescing material is particularly efficient if, in addition to the solvent and the fluorescing dye, it includes esters and surfactants.

When configuring the radiation pattern, recourse can fundamentally be had to known methods, just the preferred ultraviolet light is used, whose intensity can be varied in three dimensions for formation of the radiation pattern. Thus, here also the radiation pattern can be a striped pattern or a checkerboard pattern. The radiation pattern can change over time, preferably periodically, so that a multiplicity of pictures can be taken, which show the object with radiation patterns that are projected on in varied fashion.

The disclosure-specific use of the film made of fluorescing material also makes possible a scanning of the object. The radiation pattern is thus not projected on all at once as a whole, but rather the object is irradiated in sections (of the radiation pattern) in a temporal sequence.

The disclosure-specific arrangement for detection of the surface of an object includes a radiation pattern projection device and a picture registration device. When pictures are recorded, the picture registration device utilizes electromagnetic radiation in a wavelength range in which the radiation pattern projection device emits no electromagnetic radiation.

It has already been mentioned in connection with the above process that the picture registration device can include a filter which filters out wavelengths from the wavelength range in which the radiation pattern projection device emits radiation.

With the disclosure-specific arrangement, the radiation pattern projection device preferably is also distinguished from customary devices in that it includes an ultraviolet light source as the sole light source. In designing the radiation pattern projection device, fundamentally recourse can be had to knowledge of how customary radiation pattern projection devices with light sources which emit visible light look. In selecting components, care must only be taken about the capability of the manner of functioning to be combined with the use of especially short-wave light (ultraviolet light). When using reflecting surfaces such as micromirrors from a digital micromirror device (DMD), care must be taken that also with the ultraviolet used, they have a sufficient reflectivity. Customary micromirrors are coated with highly polished aluminum in such a way that a sufficient reflectivity of about 90 percent results even in the near ultraviolet. The micromirror arrangement operates at reduced pressure in a special gas mixture and is hermetically sealed, and therefore placed behind a window. Naturally it must also be ensured that this window is also highly transparent for the ultraviolet radiation used.

As with known arrangements for optical detection of surfaces of an object, the radiation pattern projection device can include a laser light source. However, preferably a laser in the range of the near ultraviolet or also the far violet, for example with a defined wavelength of between 400 and 410 nm, is now used.

Also in accordance with the disclosure is that at first the surface of an engine part such as a turbine blade is coated with a film of fluorescing material capable of being washed off.

BRIEF DESCRIPTION OF THE DRAWINGS

FIG. 1 shows an arrangement for detecting the surface of an object in accordance with one embodiment.

DETAILED DESCRIPTION

In what follows, a preferred embodiment form of the invention is described while referring to the drawing, with the FIGURE illustrating a disclosure-specific arrangement for detection of the surface of an object and the emitted and received pattern.

An arrangement given the overall designation of 10 for optical detection of the surface of an object has a radiation pattern projection device 12 which emits ultraviolet radiation which impresses a pattern. Shown as an example is a striped pattern 14a, with the intensity of the radiation being modulated perpendicular to the course of the strip in sine-wave fashion, and remaining spatially constant along the strip length. The radiation pattern undergoes a temporal variation, i.e., the strips migrate. Striped patterns 14b and 14c that temporally follow striped pattern 14a are also shown in the FIGURE.

Since ultraviolet radiation is used here to generate striped patterns 14a, 14b and 14c, fundamentally recourse can be had when designing radiation pattern projection device 12 to knowledge regarding the design of customary radiation pattern projection devices. The components must be adapted to the use of ultraviolet. This starts with an ultraviolet light source, namely a suitable ultraviolet laser. Instead of direct ultraviolet, visible light at the boundary with ultraviolet can be used, for example with a wavelength of 405 nm. Digital micromirror devices made from customary radiation pattern projection devices can be used in principle; for example, Texas Instruments markets a special chip in which a UV window is inserted during the manufacturing process, which is highly transparent for a wavelength up to 350 nm, thus for the ultraviolet. The micromirrors are coated with highly-polished aluminum and have a reflectivity of about 90 percent, and in fact also in the near ultraviolet.

In the area of the surface investigated, the object to be studied, which is not separately shown in the FIGURE, is coated with a mixture of a solvent, esters and surfactants with fluorescing dyes in solution. Such a mixture is known from the applicant under the name Ardrox 970 P24.

Through the fluorescing material on the surface of the object to be tested the UV light is absorbed, and visible light is emitted. The visible light reaches a picture recording device 16, which can, like customary arrangements, be designed to optically detect the surface of an object, including, but only if necessary, a filter to filter out the light emitted from radiation pattern projection device 12. By picture recording device 16, which can also be a stereo camera, a series of pictures 18a, 18b, 18c can be taken, with each of these assigned to strip patterns 14a, 14b and 14c, which is possible through temporal coordination of radiation pattern projection device 12 and picture recording device 16 in arrangement 10. Arrangement 10 includes a computer assessment unit that is not shown on its own, which calculates the three-dimensional contour of the surface based on the assignment of the pictures taken to the strip patterns, so that the goal of the process is achieved.

Pictures 18a to 18c show a hand as the object. The main area of application of the invention is surface analysis of engine parts of turbine blades. The hand depiction is only to facilitate understanding of the invention.

Owing to the invention-specific separation of the wavelength ranges of the emitted ultraviolet radiation and the received visible light radiation, no more disturbing reflections occur in picture recordings 18a, 18b, 18c. Also, the intensity noise (speckle noise) is suppressed. Due to use of short-wave ultraviolet radiation, especially high picture resolution is achieved.

The invention claimed is:

1. A process for detection of, a turbine blade surface, the process including the following steps:
   providing a turbine blade having a surface to be detected;
   applying a washable film to the surface to be detected, the film being made of a fluorescing material which, when irradiated with electromagnetic radiation from a first wavelength range from 350 nanometers to 410 nanometers, emits electromagnetic radiation in a second, visible light, wavelength range, the washable film consisting of fluorescing dyes, a solvent, esters and surfactants in a washable solution;
   providing a radiation pattern projection device, having, as a sole light source, a laser light source that emits radiation in a defined wavelength range from 400 nanometers to 410 nanometers and a digital micromirror device for projecting a radiation pattern by reflecting light from the laser light source, the digital micromirror device including a window and a plurality of micromirrors coated with polished aluminum and having a reflectivity of 90 percent of radiation in the defined wavelength range of from 400 nanometers to 410 nanometers and wherein the micromirrors are hermetically sealed at reduced pressure and positioned behind a window transparent to radiation in the defined wavelength range of from 400 nanometers to 410 nanometers and irradiating the washable film on the turbine blade surface to be detected, in parts, in a temporal sequence, with a projected radiation pattern using electromagnetic radiation projected with the radiation pattern projection device in the defined wavelength range;

providing a filter for filtering out radiation in the defined wavelength range and filtering out radiation in the defined wavelength range from 400 nanometers to 410 nanometers from visible light emitted by the washable film upon irradiation with the radiation pattern projection device and receiving the filtered radiation emitted from the washable film on the surface of the turbine blade with a stereo camera;

recording, with the stereo camera, in the wavelength range of visible light a series of temporally altered pictures using the filtered received radiation;

providing a computer assessment unit that calculates a three-dimensional contour of the turbine blade surface to be detected based on the assignment of the recorded picture(s) to the projected pattern(s) and analyzing the three-dimensional contour of the turbine blade surface with the computer assessment unit; and washing the washable film, including the fluorescing dyes, solvent, esters and surfactants, away from the turbine blade surface after analyzing the three-dimensional contour of the turbine blade surface with the computer assessment unit.

2. A process according to claim 1, wherein the radiation pattern is temporally altered, and a plurality of pictures is recorded, each such picture showing the object with a radiation pattern different from the others.

3. A process according to claim 1, wherein the radiation pattern is a striped pattern.

4. A process according to claim 1, wherein the radiation pattern is a checkerboard pattern.

5. A system for recording a turbine blade surface, the system comprising:

a washable film, a fluorescing material which, when irradiated with electromagnetic radiation from a first wavelength range from 350 nanometers to 410 nanometers, emits electromagnetic radiation in a second, visible light, wavelength range, the washable film consisting of fluorescing dyes, a solvent, esters and surfactants in a washable solution;

a radiation pattern projection device, having, as a sole light source, a laser light source that emits radiation in a defined wavelength range from 400 nanometers to 410 nanometers and a digital micromirror device for projecting a radiation pattern by reflecting light from the laser light source, the digital micromirror device including a window and a plurality of micromirrors coated with polished aluminum and having a reflectivity of 90 percent of radiation in the defined wavelength range of from 400 nanometers to 410 nanometers and wherein the micromirrors are hermetically sealed at reduced pressure and positioned behind a window transparent to radiation in the defined wavelength range of from 400 nanometers to 410 nanometers, the radiation pattern device operable to irradiate the washable film when applied to the surface of the turbine blade to be detected, in parts, in a temporal sequence, with a projected radiation pattern using electromagnetic radiation projected with the radiation pattern projection device in defined wavelength range;

a filter operable to filter out radiation in the defined wavelength range from 400 nanometers to 410 nanometers from visible light emitted by the washable film upon irradiation with the radiation pattern projection device;

a stereo camera operable to record a series of temporally altered pictures of the turbine blade surface, using the filtered received radiation in the wavelength range of visible light;

a computer assessment unit operable to calculate a three-dimensional contour of the turbine blade surface to be detected based on the assignment of the recorded picture(s) to the projected pattern(s) and analyze the three-dimensional contour of the turbine blade surface; and wherein, the washable film, including the fluorescing dyes, solvent, esters and surfactants, is washed away from the turbine blade surface after analyzing the three-dimensional contour of the turbine blade surface with the computer assessment unit.

6. The system of claim 5 wherein the radiation pattern is a striped pattern.

7. The system of claim 5, wherein the radiation pattern is a checkerboard pattern.

8. The system of claim 5 wherein the radiation pattern is temporally altered, and wherein the stereo camera is operable to record a plurality of pictures is recorded, each such picture showing the object with a radiation pattern different from the others.

* * * * *